United States Patent [19]
Sato et al.

[11] Patent Number: 5,183,993
[45] Date of Patent: Feb. 2, 1993

[54] LASER BEAM MACHINING SYSTEM AND LASER BEAM MACHINE COVER

[75] Inventors: Takeshi Sato; Minoru Tashiro; Naoomi Miyakawa, all of Aichi, Japan

[73] Assignee: Yamazaki Mazak Corporation, Japan

[21] Appl. No.: 713,847

[22] Filed: Jun. 12, 1991

[30] Foreign Application Priority Data

Jun. 19, 1990 [JP] Japan .................. 2-64036[U]

[51] Int. Cl.⁵ .............................. B23K 26/02
[52] U.S. Cl. ..................... 219/121.82; 219/121.78
[58] Field of Search ............ 219/121.74, 121.78, 219/121.79, 121.68, 121.65, 121.63, 121.64; 364/474.08

[56] References Cited

U.S. PATENT DOCUMENTS

| | | | |
|---|---|---|---|
| 4,636,608 | 1/1987 | Palentyn et al. | 219/121.72 |
| 4,760,237 | 7/1988 | Mizukado et al. | 219/121.82 |
| 4,985,780 | 1/1991 | Garnier et al. | 219/121.68 |
| 5,049,723 | 9/1991 | Macdonald | 219/121.78 X |

FOREIGN PATENT DOCUMENTS 102252  7/1984  European Pat. Off.

Primary Examiner—C. L. Albritton
Attorney, Agent, or Firm—Beveridge, DeGrandi & Weilacher

[57] ABSTRACT

A laser beam machining system includes of a laser beam machine and a work conveying robot, wherein the laser beam machine has a table which is covered by a cover that is automatically opened/closed, and the robot runs on a rail provided above the table of the laser beam machine to feed work onto the table. The cover of the laser beam machine is opened only when work pieces are fed or removed and the cover is closed when work pieces are machined. The upper face of the table is completely open when the cover is opened so that handling by means of the robot may be easily executed.

9 Claims, 8 Drawing Sheets

LASER BEAM MACHINING SYSTEM AND LASER BEAM MACHINE COVER

BACKGROUND OF THE INVENTION

1. Field of the Invention

The present invention relates to a laser beam machining system and, more particularly, to a cover apparatus of a laser beam machine.

2. Description of the Related Art

A cover apparatus for covering a machining part is provided in a laser beam machine to protect an operator from the reflection of a laser beam and to insulate gas and splutter generated during machining.

Figure 10:
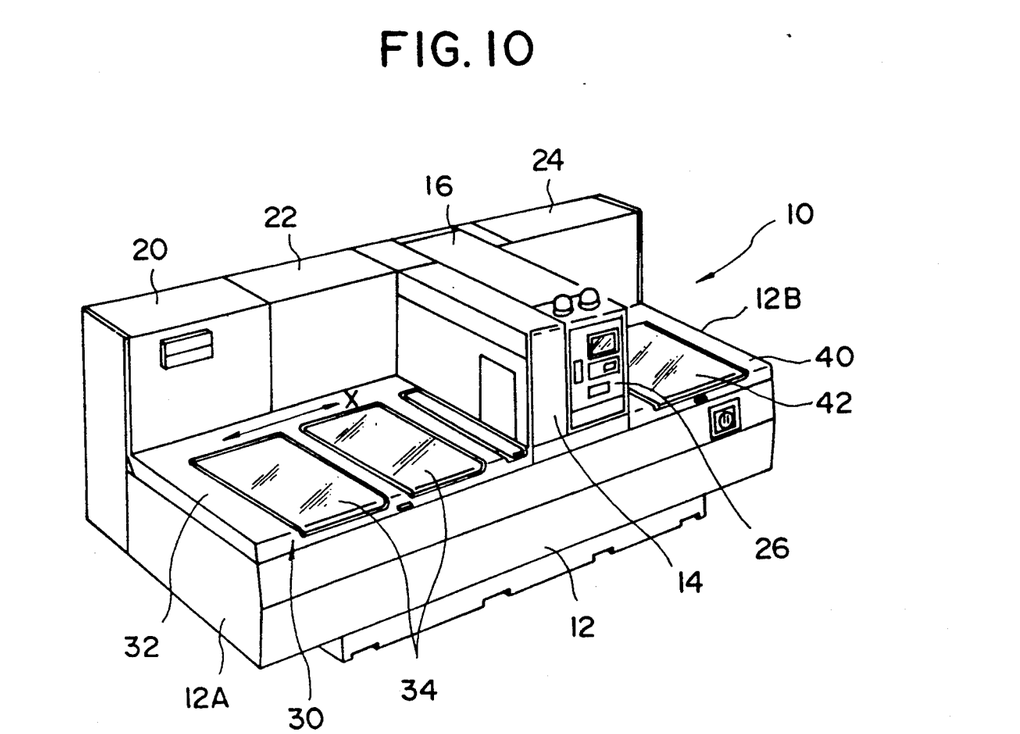
FIG. 10 is a perspective view showing a conventional system.
Figure 11:
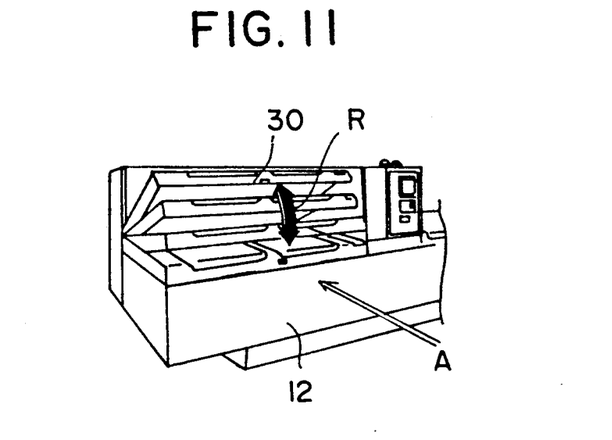
FIG. 11 is an explanatory drawing showing the operation of a conventional system.

FIG. 10 is a perspective view showing a laser beam machine provided with a conventional cover apparatus, and FIG. 11 is an explanatory drawing showing the opening and closing states of the cover apparatus.

The laser beam machine designated by reference number 10 has a table (not shown) provided on a base 12. The table is set in a manner in which it is capable of moving along an x-axis linking a frontal end 12A and a rear end 12B of the base 12 in the longitudinal direction. Built on the base 12 is a column 14 which straddles the table. A machining head (not shown) is supported by the column 14 in a manner in which the machining head is capable of moving along a y-axis, which crosses at a right angle with the x-axis on a plane parallel to the table, and along a z-axis, which is vertical to the table. A laser oscillator 16 attached to the column 14 oscillates and supplies a laser beam to the machining head.

Provided on the rear side of the base 12 are such equipment as a power unit 20, a chiller unit 22 for treating cooling water and a laser beam power supply 24.

Operations of each equipment of the laser beam machine 10 are controlled by a controller 26, which contains a numerical controller, provided at the front of the column 14.

The table is set in a manner in which it is capable of moving across the entire length of the base 12 along the x-axis, though the length of the table in the x-axis direction is set to approximately half of the moving distance. A cover apparatus 30 that covers the whole face of the table is mounted above the table.

The cover apparatus 30 is provided with windows 34, comprised of a semi-transparent material, at appropriate positions of the body of the cover. One side of the cover apparatus 30 is mounted to the base 12 in a manner in which the cover apparatus can be freely turned by means of hinges, etc. Accordingly, the cover apparatus 30 opens and closes as shown by arrow R and untreated works are fed onto the table or machined works are removed from the table by moving the works in the direction of arrow A from the front of the laser beam machine.

Works loaded onto the table are machined by the machining head provided underneath the column 14. The table moves in the x-axis direction toward the rear end portion 12B of the base 12 going underneath the column 14.

The upper face of the table at this state is also covered by another cover apparatus 40. Another window 42 comprised of a semi-transparent material is provided at an appropriate position of this second cover apparatus 40 and this cover apparatus 40 is mounted in a manner in which it can be freely opened by means of hinges, etc.

OBJECT OF THE INVENTION

A conventional cover apparatus of a laser beam machine was structured as mentioned above so that works would need to be moved in parallel to the table face to feed/remove works onto/from the table and so that works could not be moved in a vertical direction.

This restriction has been disallowing works to be automatically fed/remove by means of a robot, etc., and has been a factor in the hindering of the automation of laser beam machining.

Accordingly, the object of the present invention is to provide an apparatus suitable for automatically feeding/removing works onto/from a table of a laser beam machine by means of a robot.

SUMMARY OF THE INVENTION

According to the present invention, there is provided a laser beam machining system comprising a laser beam machine and a work conveying robot which automatically feeds/removes works onto/from the laser beam machine.

Works are mounted on a table of the laser beam machine and the upper face of the table is covered during machining. A cover apparatus slides on a guide rail mounted on a bed of the laser beam machine. The upper face of the table is in a completely open state when the cover is opened so that works can be fed onto the table from the vertical direction.

A cover is automatically opened or closed by an air cylinder.

DETAILED DESCRIPTION OF PREFERRED EMBODIMENTS

Referring now to the drawings, a preferred embodiment of the present invention will be explained.

Figure 1:
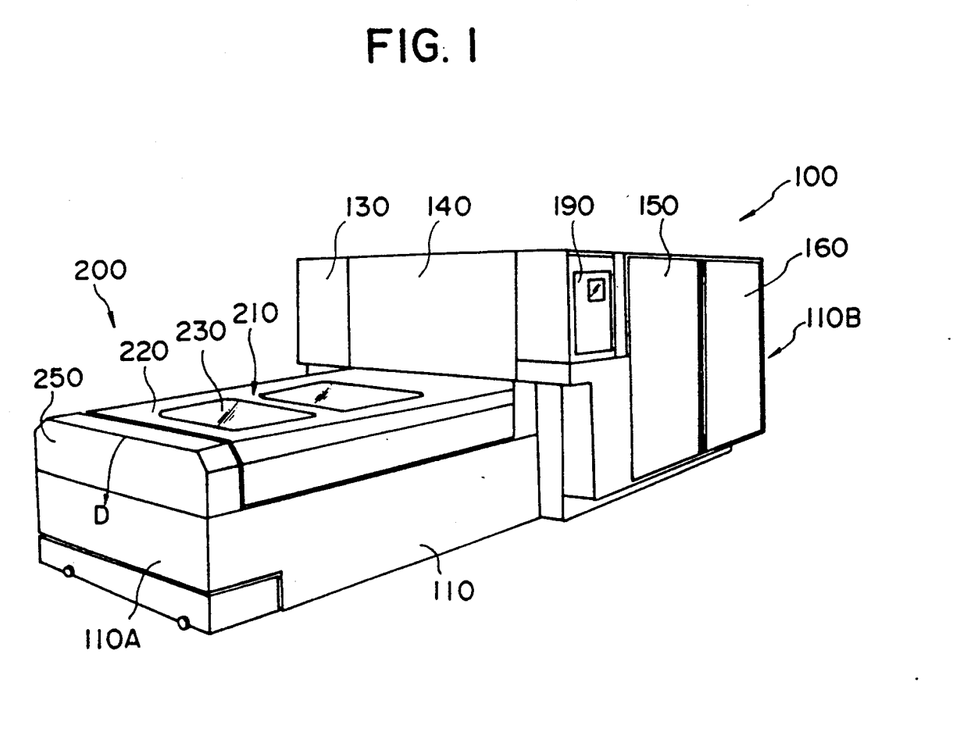
FIG. 1 is a perspective view showing an embodiment of the present invention.
Figure 2:
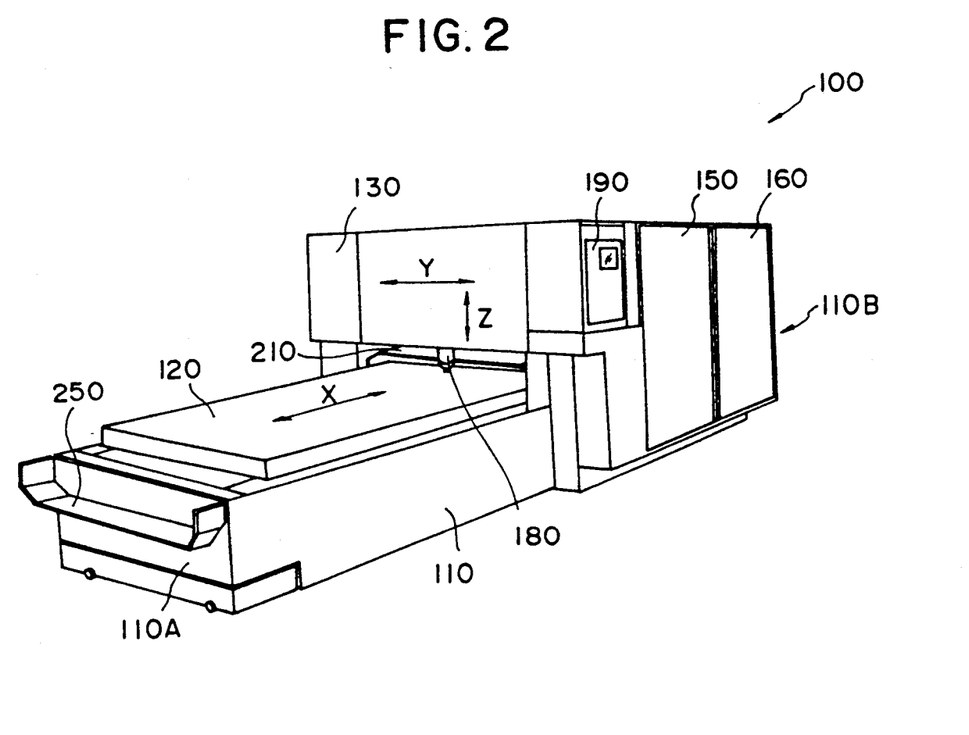
FIG. 2 is a perspective view showing the state when a cover apparatus is opened.

FIG. 1 is a perspective view showing an outline of a laser beam machine with a cover apparatus of the present invention. FIG. 2 is a perspective view showing the state when a cover apparatus is opened.

The laser beam machine shown by reference number 100 has a table 120 on a base 110. The table 120 moves along an x-axis that connects a frontal end portion 110A and a rear end portion 110B of the base 110 in the longitudinal direction. A column 130 is built on the base 110 in a gate shape and a cover 140, which covers the front face of the column 130, supports within a machining head 180 in a manner in which the machining head is capable of moving along a y-axis that crosses at a right angle with the x-axis of the table 120 and along a z-axis that is vertical to the table 120.

Provided at the rear side of the column 130 are necessary equipment such as a laser oscillator 150 and a power unit 160, and mounted at the operator side of the column 130 is a controller 190, containing a numerical controller.

The upper part of the entire space through which the table 120 moves is covered by a cover apparatus designated by reference number 200, and the internal space in the cover apparatus 200 is linked to a dust collector, etc. (not shown).

The cover apparatus 200 has a sliding cover 210 and a turning cover 250.

The sliding cover 210 comprises of a sliding cover body 220, fabricated by forming a metal plate, and of windows 230 comprised of a semi-transparent material attached on the openings provided on the upper face of the sliding cover body 220.

The sliding cover body 220 has an upper plate, which is parallel with the table 120, and side plates, which are the portions bent downward from both sides of the upper plate, and their front and rear edge portions are opened. The sliding cover 210 is placed on rails provided on both side portions of the base 110 and is slidable in the x-axis direction.

On the other hand, the turning cover 250 has a cross section that corresponds to that of the sliding cover 210 and is mounted on the upper edge portion of the frontal end portion 110A of the base 110 in a manner in which the turning cover is turnable in the direction of arrow D by means of hinges.

FIG. 2 shows the state when the sliding cover 210 is slid along the x-axis and underneath the gate shaped column 130 to open the upper face of the table 120, and the turning cover 250 is opened by turning it 180 degrees in the direction of arrow D.

Figure 3:
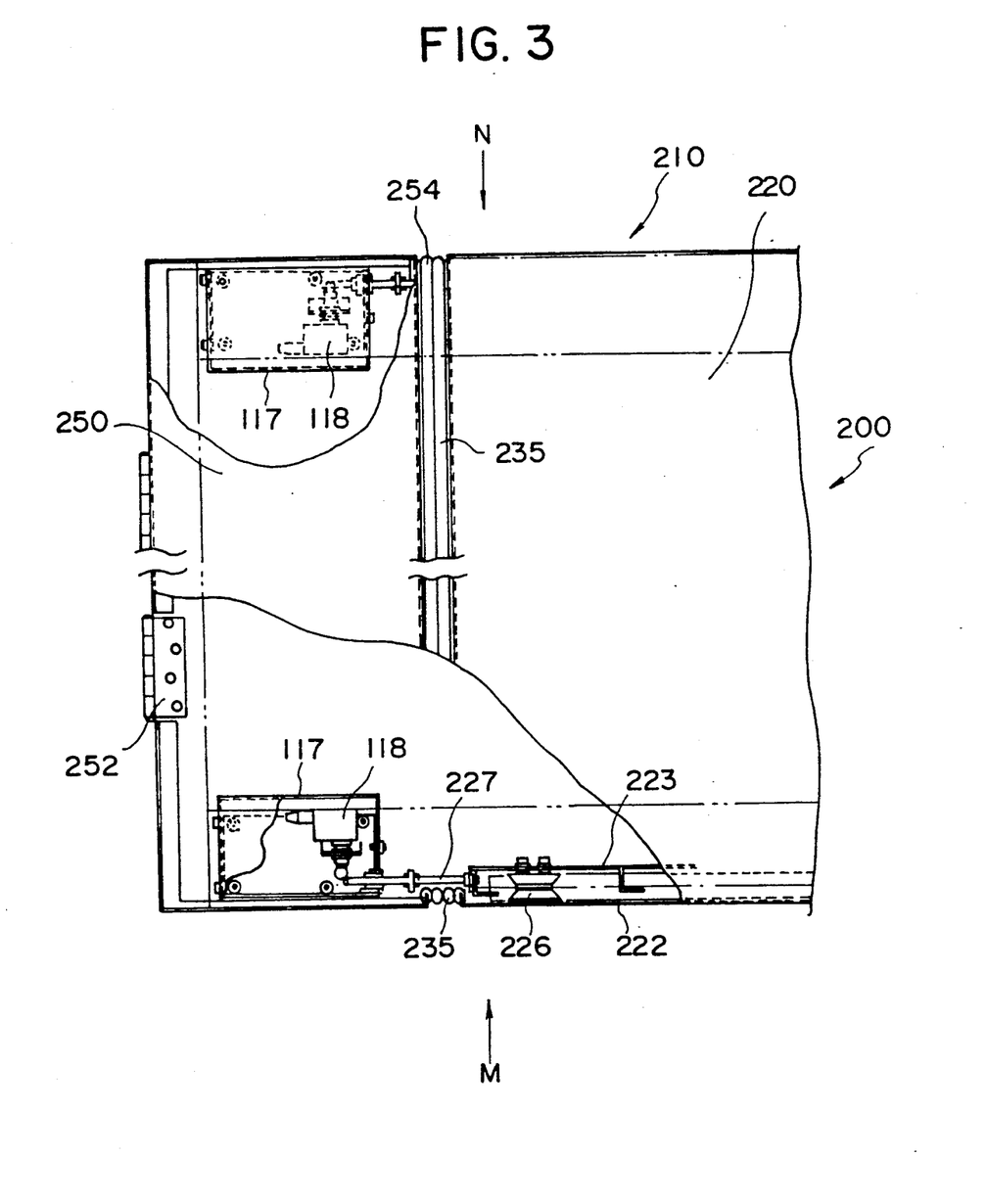
FIG. 3 is a plan view, partially in cross section, of the main part of a cover apparatus.
Figure 4:
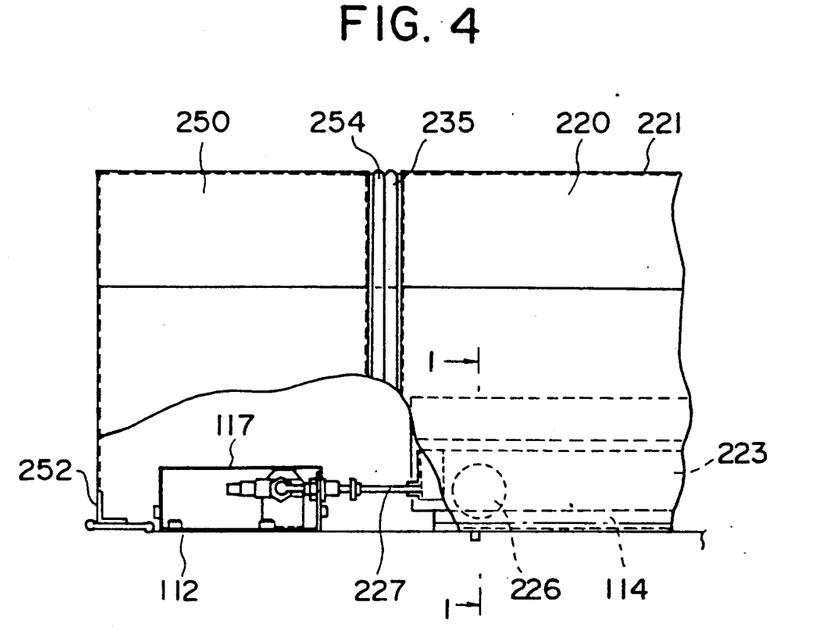
FIG. 4 is a view in the direction of the arrow M in FIG. 3.
Figure 5:
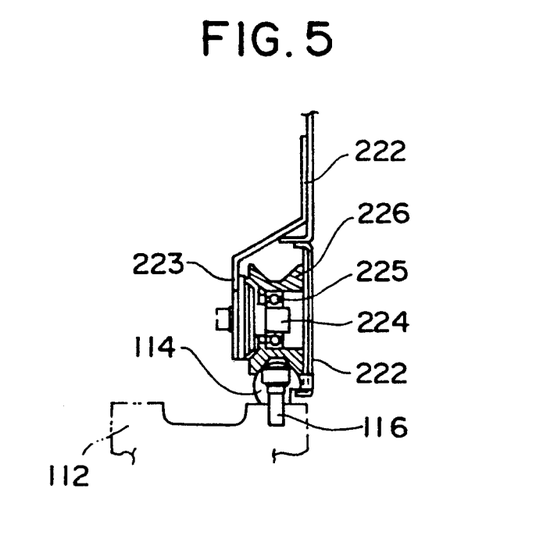
FIG. 5 is a sectional view along the line 1—1 in FIG. 4.
Figure 6:
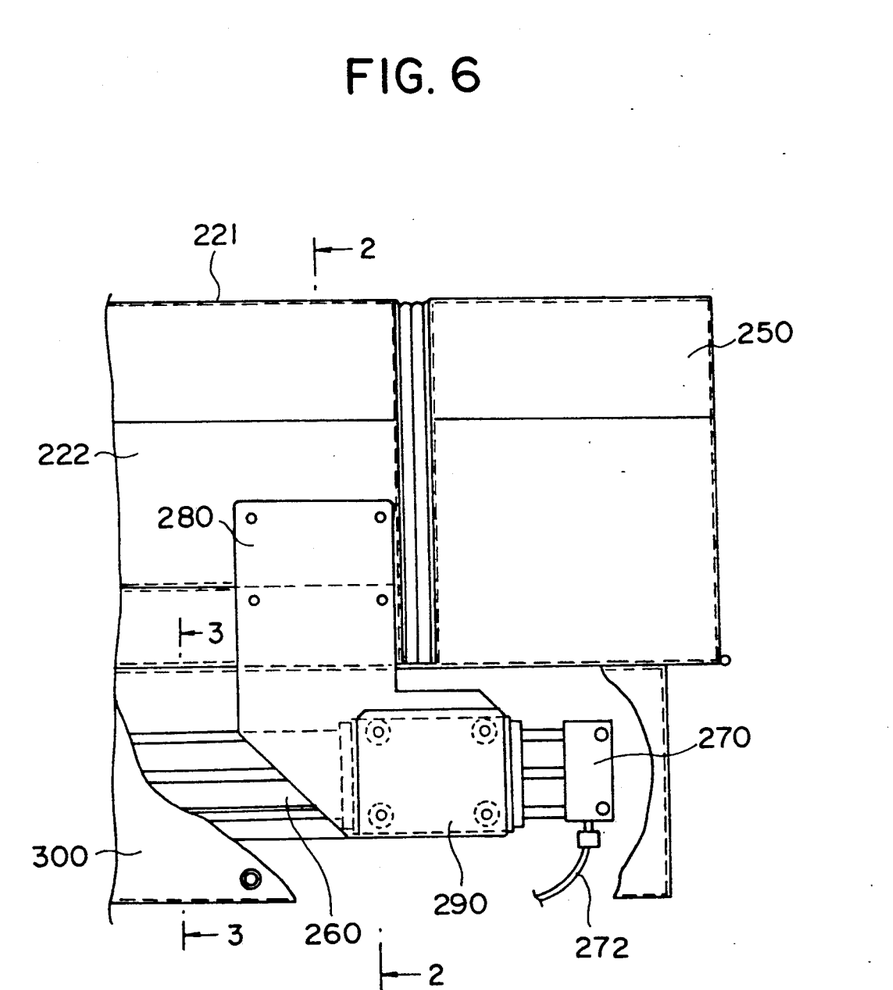
FIG. 6 is a view in the direction of the arrow N in FIG. 3.
Figure 7:
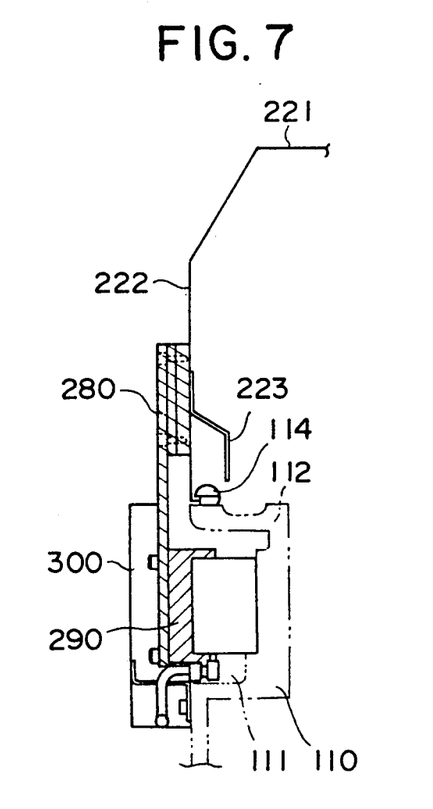
FIG. 7 is a sectional view along the line 2—2 in FIG. 6.
Figure 8:
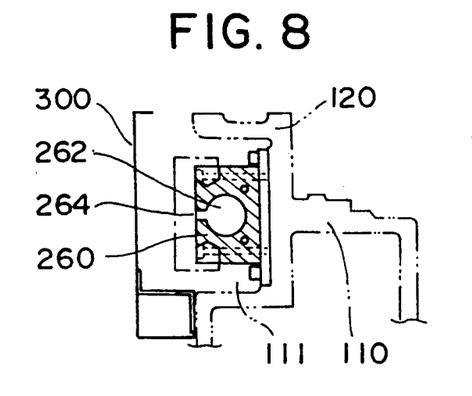
FIG. 8 is a sectional view along the line 3—3 in FIG. 6.

FIG. 3 is a plan view, partially in cross section, of the main part of the cover apparatus 200. FIG. 4 is a view, partially in cross section, in the direction of the arrow M in FIG. 3. FIG. 5 is a view in the direction of the line 1—1 in FIG. 4. FIG. 6 is a view in the direction of the arrow N in FIG. 3. FIG. 7 is a view in the direction of the line 2—2 in FIG. 6, and FIG. 8 is a view in the direction of the line 3—3 in FIG. 6.

A body 220 of the sliding cover 210 comprises of an upper plate 221 which is parallel with the table 120, and side plates 222 which are portions of the upper plate 221, which were formed by bending downward. Openings are made in appropriate positions of the upper plate 221 to install windows 230.

An auxiliary plate 223 is anchored to the lower edge portion of one of the side plates 222 the inside thereof in parallel therewith. Planted to the auxiliary plate 223 is a shaft 224 which supports a roller 226 through the intermediary of bearings 225.

A guide rail 114 is fixed to the upper edge portion 112 of the base 110 by means of bolts 116. Although a guide rail with a round cross section is used for the guide rail 114 in the present embodiment, any guide rail with an appropriate cross section may be used in accordance with the shape of the roller 226.

The sliding cover 210 supported by the roller 226 on the guide rail 114 moves thereon by means of a driving means.

FIGS. 6, 7 and 8 show details of the driving means. An air cylinder 260 is installed within a concave section 111 formed on the outer side of the base 110. A cylindrical portion 262 is formed within the air cylinder 260. This is a so-called rodless type air cylinder in which a slit 264 is provided on the outside of the cylindrical portion 262. The air cylinder 260 has an entire length that matches with a stroke of the sliding cover 210 and air supplying members 270 are installed at both ends of the air cylinder 260. The air supplying member 270 are linked with an air supplier (not shown) through the intermediary of pipes 272.

On the other hand, one end portion of a plate shaped connecting member 280 is anchored to one of the side plates 222 of the sliding cover body, and the other end portion of the connecting member 280 is connected with a piston 290. A cover 300 is provided on the outside of the air cylinder 260.

The driving means structured as described above is operated as follows. When air is supplied to the air cylinder 260 through the intermediary of the air supplying members 270, the piston 290 is pressed and moved by the pressure of the air and drives the sliding cover 210.

A rod 227 is mounted on the edge portion of the sliding cover 210, and it is confirmed that the sliding cover 210 is at the "closed" position when the rod 227 presses a limit switch 118 within a case 117 mounted in the base 110.

A trim seal 235 comprised of a flexible material is attached to the edge portion of the sliding cover body 220.

Although an example of the rodless air cylinder has been explained as the driving means of the sliding cover 210 in the present embodiment, any appropriate driving means such as an air cylinder with a rod, chain, wire etc., may be used.

The turning cover 250 provided facing the sliding cover 210 is mounted on the upper edge portion 112 of the base 110 in a manner in which the turning cover is turnable by means of hinges.

Another trim seal 254 is attached on the edge portion, which faces the sliding cover 210, of the turning cover 250 to achieve together with the other trim seal 235 of the sliding cover 210 a sealing of the junction of both covers when they are at the "closed" position.

The turning cover 250 may be opened/closed either manually or automatically, providing an appropriate driving means is used.

Accordingly, the cover apparatus of the present invention allows the upper face of the table of the laser beam machine to be completely open when the cover apparatus is at the "opened" position so that works may be automatically fed/removed onto/from the table utilizing a robot, etc.

Figure 9:
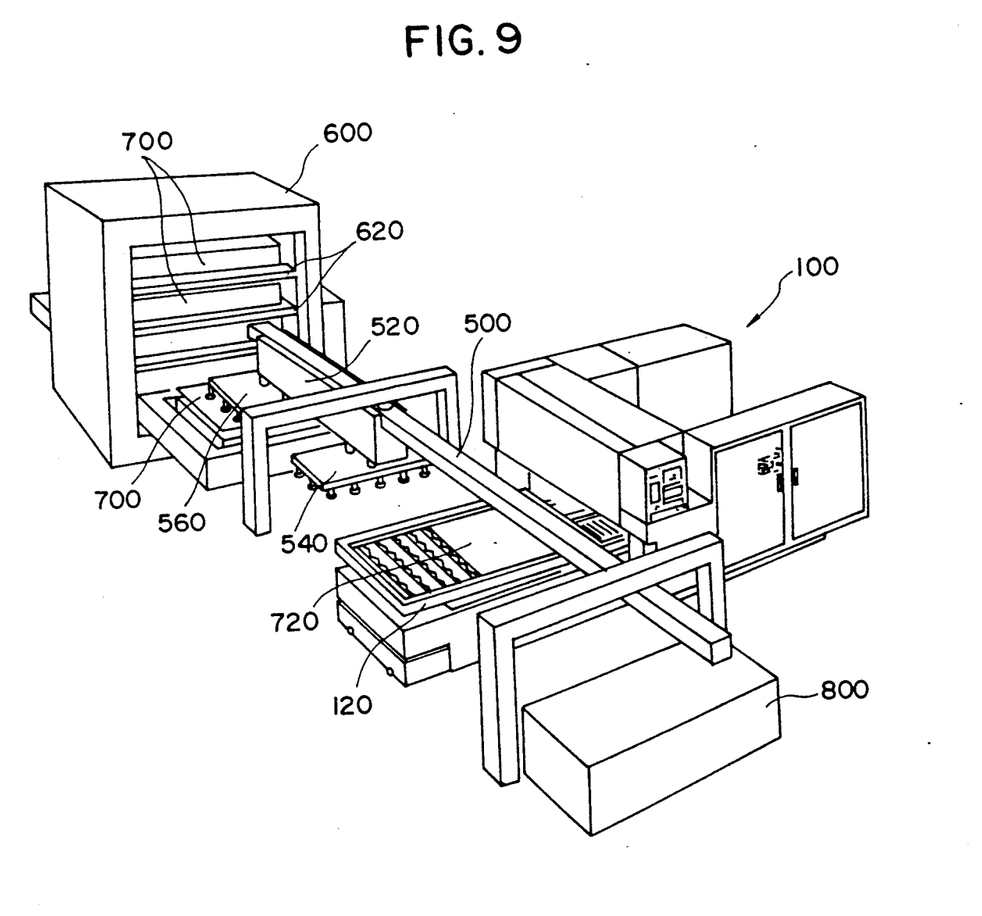
FIG. 9 is a perspective view showing an example of an automated laser beam machining system.

FIG. 9 shows an example of an automated laser beam machining system.

A rail 500 is provided above the table 120 of the laser beam machine 100 with a cover apparatus of the present invention. A conveying robot 520 is suspended from the rail 500 in a manner in which the robot is capable of freely running and has two units of chucks 540, 560.

A stocking unit 600 for stocking untreated works provided at one end portion of the rail 500 has several stages of racks 620 within which the same or differently shaped works 700 are placed.

The first chuck 560 of the conveying robot 520 absorbs an untreated work 700, moves on the rail 500 and feeds the work onto the table 120 of the laser beam machine, whose cover apparatus is open.

A controller of the laser beam machine 100 that has confirmed that the untreated work was fed issues a command to the cover apparatus to bring the cover apparatus to the "closed" position. The laser beam machine 100 then implements necessary machining to the untreated work 700.

After completion of machining, the cover apparatus is manipulated to the "opened" position and a machined work 720 is absorbed by the second chuck 540 of the conveying robot and is conveyed to the loading table 800 for machined works, provided on the other end of the rail 500. Simultaneously, the untreated work 700 held by the first chuck 560 is fed onto the table 120.

This system allows laser beam machining to continue automatically for a long period of time.

As described above, the laser beam machining system is structured that it has the sliding cover for covering the upper face of the table of the laser beam machine with the gate shaped column, and so that it accommodates the sliding cover underneath the column at the "opened" position, to maintain the space above the table at a completely opened state. Accordingly, paths for feeding and removing works onto/from the table may be freely set and thereby feeding/removal of works may be automated utilizing a conveying robot, etc.

It is also appreciated that unmanned machining for a long period of time may be achieved by linking the feeding/removal of works and the automation of laser beam machining, since the sliding cover may be automatically opened/closed by means of the driving means.

It is further appreciated that the turning cover, which cooperates with the sliding cover, enables the space above the table to be further opened and allows the facilitation of the feeding and removal of works, and the maintenance and inspection of the laser beam machine.

What is claimed:

1. A laser beam machining system comprising:
   a laser beam machine having:
   a base,
   a gate shaped column provided above said base,
   a table driven underneath said column in an X-axis direction which is the longitudinal direction of said base,
   a machining head supported by said column and driven in a Y-axis direction which crosses at a right angle with said X-axis, and
   a cover for covering said table, said cover being slidable over an upper face of said table whereby said cover assumes an open position underneath said column;
   a rail provided above said table; and
   a conveying robot which runs along said rail.

2. A laser beam machining system according to claim 1, wherein a loading station for loading untreated work is provided at one end portion of said rail.

3. A laser beam machining system according to claims 1, wherein said work conveying robot has two chuck units.

4. A laser beam machining system according to claim 1, further comprising means for moving said cover, whereby said cover is automatically opened only during processes when works are fed onto or removed from said table by said conveying robot and said cover is closed during machining.

5. A cover apparatus of a laser beam machine having a base with a rectangular planar shape, a table driven in an x-axis direction which is the longitudinal direction of the base, an openable cover for covering the table, a gate shaped column provided above the base, and a machining head supported by the column and driven in a y-axis direction which crosses at a right angle with the x-axis;
   wherein said cover apparatus has a guide rail mounted on said base, a sliding cover for covering the upper face of said table by being supported in a manner in which the sliding cover is slidable on the guide rail and is accommodated underneath said column in its "opened" position.

6. A cover apparatus of a laser beam machine according to claim 5, wherein a driving means of said sliding cover comprises of an air cylinder mounted on said base and an air piston mounted onto the sliding cover and is slidably driven within the air cylinder.

7. A cover apparatus of a laser beam machine according to claim 6, wherein said air cylinder is a rodless cylinder.

8. A cover apparatus of a laser beam machine that has a base with a rectangular planar shape, a table driven in an x-axis direction which is the longitudinal direction of the base, an openable cover for covering the table, a gate shaped column provided above the base, and a machining head supported by the column and driven in a y-axis direction which crosses at a right angle with the x-axis;
   wherein said cover apparatus has the following: a guide rail mounted on said base, a sliding cover for covering the upper face of said table by being supported in a manner in which the sliding cover is slidable on said guide rail and is accommodated underneath the column in its "opened" position, and a turning cover which is mounted on a frontal end portion of the base in a manner in which the turning cover is turnable by means of hinges and covers the upper face of the table by joining with the sliding cover in its "closed" position.

9. A cover apparatus of a laser beam machine according to claim 8, wherein a sealing member is attached on the joint sections of said sliding cover and said turning cover.

* * * * *